Figure 1:
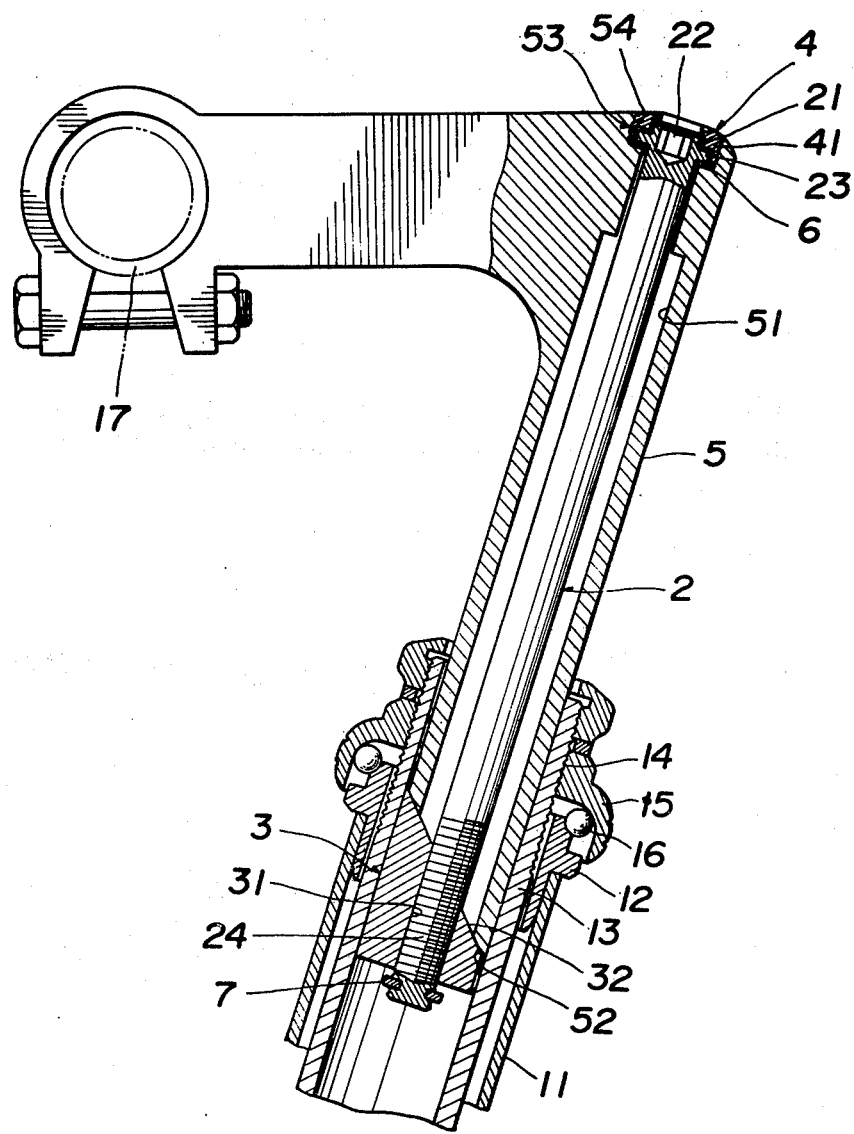

United States Patent [19]

Katayama

[11] 4,274,301

[45] Jun. 23, 1981

[54] HANDLE STEM FIXING DEVICE FOR A BICYCLE AND THE LIKE

[75] Inventor: Hitoshi Katayama, Sakai, Japan

[73] Assignee: Shimano Industrial Company Limited, Osaka, Japan

[21] Appl. No.: 921,068

[22] Filed: Jun. 30, 1978

[30] Foreign Application Priority Data

Jul. 12, 1977 [JP] Japan ............................ 52-92841[U]

[51] Int. Cl.² ...................... B62K 21/16; F16B 13/10
[52] U.S. Cl. .................................. 74/551.1; 403/191;
403/370; 403/11
[58] Field of Search ................ 74/511 R, 551.1–551.9;
16/114 R, 114 A; 403/191, 290, 347, 367, 11,
16, 21, 370, 374

[56] References Cited

U.S. PATENT DOCUMENTS

| 897,579 | 9/1908 | Brannan | 74/551.2 |
| 1,060,442 | 4/1913 | Erickson | 74/551.2 |
| 2,381,050 | 8/1945 | Hardinge | 85/74 X |
| 2,505,648 | 4/1950 | Pawsat | 74/551.1 |
| 2,718,155 | 9/1955 | Firth | 403/370 X |
| 3,136,203 | 6/1964 | Davis | 85/70 |
| 3,247,754 | 4/1966 | Bieser | 85/68 |
| 3,361,455 | 1/1968 | Hussey et al. | 74/551.6 X |
| 3,941,011 | 3/1976 | Kirk | 74/551.2 |
| 4,095,911 | 6/1978 | Lacroix | 403/374 X |

FOREIGN PATENT DOCUMENTS

| 2261348 | 6/1973 | Fed. Rep. of Germany . | |
| 2235829 | 1/1975 | France | 74/551.1 |
| 7388 | of 1904 | United Kingdom | 74/551.6 |

Primary Examiner—Louis Rimrodt
Attorney, Agent, or Firm—Stevens, Davis, Miller & Mosher

[57] ABSTRACT

A handle stem fixing device for a bicycle is described in which a rotary control is provided at the head of a bolt, the head being larger in diameter than the bolt stud or alternatively having a flange, and a socket is provided at a hollow handle stem, into which the head is lodged and a retainer is provided, whereby the retainer substantially blocks the bolt's axial movement and the bolt is screwed to which is forced to be axially movable.

7 Claims, 5 Drawing Figures

HANDLE STEM FIXING DEVICE FOR A BICYCLE AND THE LIKE This invention relates to a device for fixing a hollow handle stem to a front fork of a bicycle and the like.

Conventionally, the device for fixing the handle stem to the front fork is so constructed that a threaded expander bolt is inserted through the handle stem, and screwed with an expander cone, so that the expander bolt is turned to raise the cone for fixing the handle stem to the front fork.

In detail, a typical fixing device is so constructed that the lower end face of the handle stem and the end face of the cone opposite thereto are slanted with respect to the axis. The expander bolt is turned clockwise to raise the expander cone, whereby the cone is abutted at its slant end against the handle stem to be radially shifted outward, thereby being pressed onto the inner periphery of the front fork. Hence, the frictional resistance at the abutment of the handle stem and the cone and at the pressed contact thereof with the front fork enables the handle stem to be fixed to the front fork.

When carrying the dismantled bicycle within a bag for the purpose of cycling at a remote place, a user should remove the handle stem from the front fork.

In the foregoing construction, once the handle stem is fixed, wedge action at the engagement of the handle stem with the cone considerably increases the surface pressure, and furthermore, water or the like rusts the abutting faces to jam the cone, as a result, the expander bolt cannot be turned counterclockwise, and the handle stem cannot be removed from the front fork.

Hence, the expander bolt has heretofore been turned counterclockwise and the bolt hit at its head to impact the cone for removing the cone. The bolt is thereafter very hard to remove and the head happens to be damaged as well as the bolt and cone threads which are broken down and cannot be reused.

An object of the invention is to provide a handle stem fixing device capable of simply and easily pulling the handle stem out of the front fork and preventing the bolt and cone from being damaged when pulling out the handle stem.

The fixing device of the invention is so constructed that a rotary control is provided at the head of a bolt, the head being larger in diameter than the bolt stud or the bolt is provided with a flange; at the hollow handle stem is provided a socket for accommodating therein the head; and a retainer is provided within the socket so as to substantially block the bolt axial movement whereby a cone screwed with the bolt for fixing the handle stem is axially movable by use of thrust produced by the turning bolt, thus removing the handle stem from the front fork smoothly and reliably without any damage to the bolt or cone.

Figure 2:
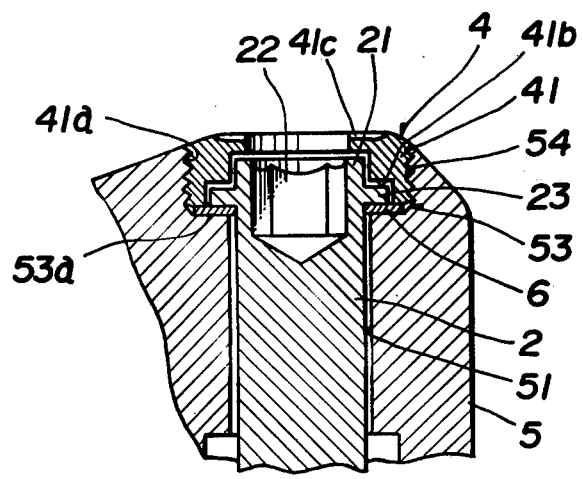
Figure 3:
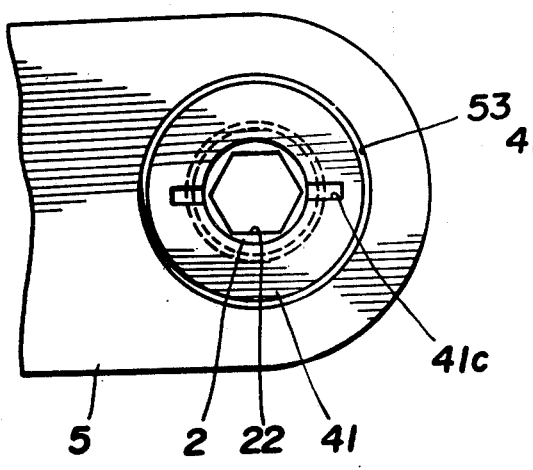
Figure 4:
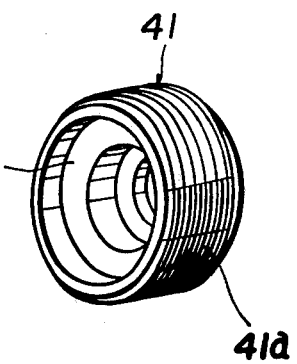
Figure 5:
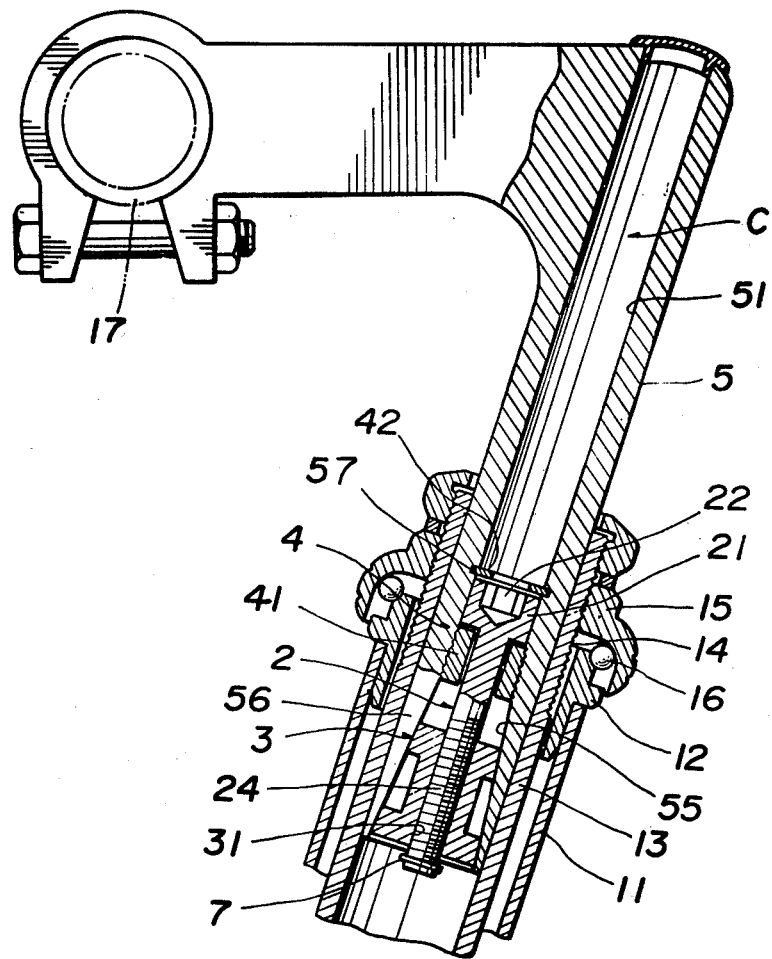

These and other objects of the invention will become more apparent in the detailed description in accordance with the accompanying drawings, in which:

FIG. 1 is a sectional view of an embodiment of the fixing device of the invention, showing the handle stem fixed to the front fork, FIG. 2 is an enlarged sectional view of the principal portion of the fixing device in FIG. 1, FIG. 3 is a plan view thereof, FIG. 4 is a perspective view of an embodiment of the retainer, and FIG. 5 is a sectional view of a modified embodiment corresponding to FIG. 1.

Referring to FIGS. 1 and 5, the reference numeral 11 designates a head pipe constituting a part of the bicycle frame. At the upper end of the head pipe 11 is fixed a top ball race 12 and at the lower end a bottom cup (not shown).

A front fork 13 is supported to a front wheel (not shown), whose upper portion is inserted through the head pipe 11. At the outer periphery of the upper end of the front fork 13 is formed a screw thread 14 with which a top ball head cup 15 opposite to the top ball race 12 is screwed. A bottom ball race (not shown) opposite to the bottom ball head cup is pressed onto the front fork at the lower portion thereof apart from the thread 14. Balls 16 are inserted between each ball head cup and ball race so as to support the front fork 13 rotatably with respect to the head pipe 11. A handle stem 5 carrying a handle bar 17 is fixed to the aforesaid front fork 13 by means of the fixing device of the invention to be hereinafter described.

The fixing device comprises a bolt 2 inserted through the central hole 51 of the hollow handle stem 5 and provided with a screw thread 24 at the tip of the bolt, a cone 3 screwable with the bolt 2 for fixing the handle stem 5, and retaining means 4 for retaining the bolt 2 preventing axial movement with respect to the handle stem 5.

The bolt 2 at the fixing device shown in FIGS. 1 through 3 is longer in its axial length than the handle stem 5 and has at a first lengthwise end (the upper end in the drawing) a head 21 having at its center a polygonal shaped control 22 for effecting rotation of the bolt, the head 21 having at its outer periphery a flange 23 or a larger diameter portion than the stud of bolt 2, and at the outer periphery of a second lengthwise end (a tip) is formed the screw thread 24 in a given axial length, the thread 24 being screwed with the cone 3.

The cone 3 is cylindrical and has an inner screw thread 31 to be screwed with the thread 24 of the bolt 2, and also is slanted at one axial end with respect to its axis so as to form an engaging face 32. The handle stem 5 is slanted at its lower end with respect to the axis of the same so as to form a slant face 52. The engaging face 32 is abutted against the slant face 52 at the lower end face of the handle stem 5 so that when the bolt 2 is turned to raise the cone 3, the engaging face 32 slides along the slant face 52, and the cone 3 moves radially outwardly to the axially thicker portion thereof. Hence, the peripheral surface at the thicker portion is pressed onto the inner surface of the front fork 13, thereby fixing the handle stem 5 thereto through the bolt and cone.

In addition, the cone 3 may alternatively be frustum-like shaped as shown in FIG. 5. In this instance, the handle stem 5 is tapered 55 at the inner periphery of the lower portion thereof and has thereat a plurality of split cutouts 56 axially extending and circumferentially regularly spaced.

The aforesaid retaining means 4 is important to the invention, which comprises at least one of the retainers 41 in engagement with the flange 23 at the bolt 2 head to substantially block axial movement of the bolt 2 with respect to the handle stem 5.

The retaining means 4 shown in FIGS. 1 and 2 is provided at the upper end of the handle stem 5 and is constructed so that the upper end of the handle stem 5 is provided with a round recess 53 larger in diameter than the flange 23 and central hole 51 and a shoulder 53a between the recess 53 and the hole 51 is provided. The head 21 of bolt 2 is inserted into the recess 53 and the flange 23 is abutted against the shoulder 53a through a washer 6, and the retainer 41 is screwed with a screw thread 54 formed at the inner periphery of the recess 53.

The retainer 41 is, as shown in FIG. 4, made cylindrical and threaded 41a at the outer periphery and stepped 41b at the inner periphery, the stepped portion 41b being opposite to the axially outer surface of the flange 23.

After the retainer 41 is screwed with the recess 53, the bolt 2 is sandwiched at its flange 23 between the shoulder 53a of the recess 53 and the stepped portion 41b of the retainer 41, thereby being restricted from moving axially.

In other words, there is an allowance of turning the bolt 2 within an interval between the shoulder 53a and the stepped portion 41b, whereby the bolt 2 is axially movable in a trace within the recess, but is substantially nonmovable.

In addition, in FIGS. 2 and 3, the reference numeral 41c designates recesses formed at the outer end face of the retainer 41, through which the retainer 41 is screwed. The inner diameter of the outer end face of the retainer 41 is made larger than that of the polygonal shaped control recess 22 of the bolt head, whereby a wrench may be fit into the recess. A stopper 7 is, as shown in FIG. 1, provided at the second end (the tip) of bolt 2 for preventing a drop of cone 3 out of the bolt 2.

In the foregoing construction the bolt 2 is pulled out of the front fork 13 in such a manner that a tool, such as a wrench, is fit into the rotary control recess 22 to be turned counterclockwise, then the bolt 2 is turned until abutted at its flange 23 against the inner stepped portion 41b of the retainer 41, whereby the retainer 41 is urged axially outward to be integral with the handle stem 5, thus blocking axial movement of the bolt 2. When the blocked bolt 2 is further turned, the thrust of screw threads 24 and 31 forces the cone 3 to move downwardly with respect to the bolt 2, whereby the cone 3 slides to leave the handle stem 5. Hence, the pressure of the cone 3 onto the inner surface of the front fork 13 is released, thereby enabling the handle stem 5 to be easily pulled out of the fork. At this time, the stopper 7 holds the cone 3 from escaping from the bolt 2.

Besides the aforesaid construction, the bolt 2 may, as shown in FIG. 5, be made shorter in length than the handle stem 5, substantially less than half thereof, and assembled into the handle stem 5 at its substantially intermediate portion.

In the embodiment shown in FIG. 5, the bolt 2 has a larger diameter head 21 in place of the flange 23 shown in FIGS. 1 and 2. The retaining means 4 comprises first and second retainers 41 and 42. The first retainer 41 comprises a cylindrical member to be screwed with the handle stem 5 as in the former embodiment, and the second one 42 comprises a split ring of a smaller inner diameter than the outer diameter of the head 21 and is insertably engaged with an annular groove 57 provided at the inner surface of the handle stem 5. Incidentally, the second retainer 42 is negligible when the recess is larger in diameter than the hole 51 and is provided to hold the bolt head. Furthermore, the split ring may be replaced by an externally threaded cylinder similar to the first retainer 41. The second retainer 42, however, has the advantage that the central hole 51 of the handle stem 5 is formed substantially straight to facilitate its machining.

Furthermore, the short bolt 2 creates vacancy C within the hole 51 as shown in FIG. 5, which maintains the product weight at a minimum. The tool, such as a wrench, may be kept within the vacancy C.

As seen from the aforesaid description, the fixing device of the invention can pull the handle stem out of the front fork forcibly, reliably and readily by the simple operation of turning the handle expander bolt which fixes the handle stem, and without damage to the bolt and cone.

While the embodiments of the invention have been shown and described, the invention is not limited to the specific construction thereof, which is merely exemplified in the specification rather than defined.

What is claimed is:

1. A fixing device for fixing a hollow handle stem to a front fork of a bicycle comprising:
    a bolt having a screw thread and being inserted through said handle stem;
    a cone screwed with said thread; and
    retaining means for retaining said bolt to said handle stem in relation of being substantially axially fixed;
    said bolt having a head with a rotary control adapted to permit rotating of the bolt, said head including a larger diameter portion than the stud of said bolt, said retaining means comprising at least one retainer being engaged with said larger diameter portion of the bolt permitting relative rotation of said bolt with respect to said retainer and connected with said handle stem so as to substantially fix said bolt axially with respect to said handle stem, whereby when said bolt is turned said retainer remains stationary and restricts axial movement of said bolt and said cone is axially moved from said handle stem by use of the thrust of the screw thread of said cone, whereby said handle stem is made detachable from the front fork.

2. The fixing device for the handle stem according to claim 1, wherein said retaining means for retaining said bolt comprises; a recess located within said handle stem which is larger in diameter than the central hole of said handle stem and has a stepped portion between said recess and said center hole; and said one retainer being connected to said recess; whereby said larger diameter portion of the bolt is retained between said stepped portion and said retainer.

3. The fixing device for the handle stem according to claim 1, wherein said retaining means for retaining the bolt includes two retainers, said retainers being connected within said central hole at an interval slightly larger in axial length than said larger diameter portion of said bolt.

4. The fixing device for the handle stem according to claim 3, wherein at least one of said two retainers comprises a split ring.

5. The fixing device for the handle stem according to claim 1, wherein at the tip of said bolt is provided a stopper for preventing said cone from dropping out.

6. The fixing device for the handle stem according to claim 1, wherein said bolt has an axial length substantially equal to that of the handle stem and said retaining means for the bolt is formed at the upper end of the handle stem.

7. The fixing device for the handle stem according to claim 1, wherein said bolt is made smaller in axial length than said handle stem and the retaining means for the bolt is formed at a substantially intermediate portion of the handle stem.

* * * * *